Patented Jan. 12, 1954

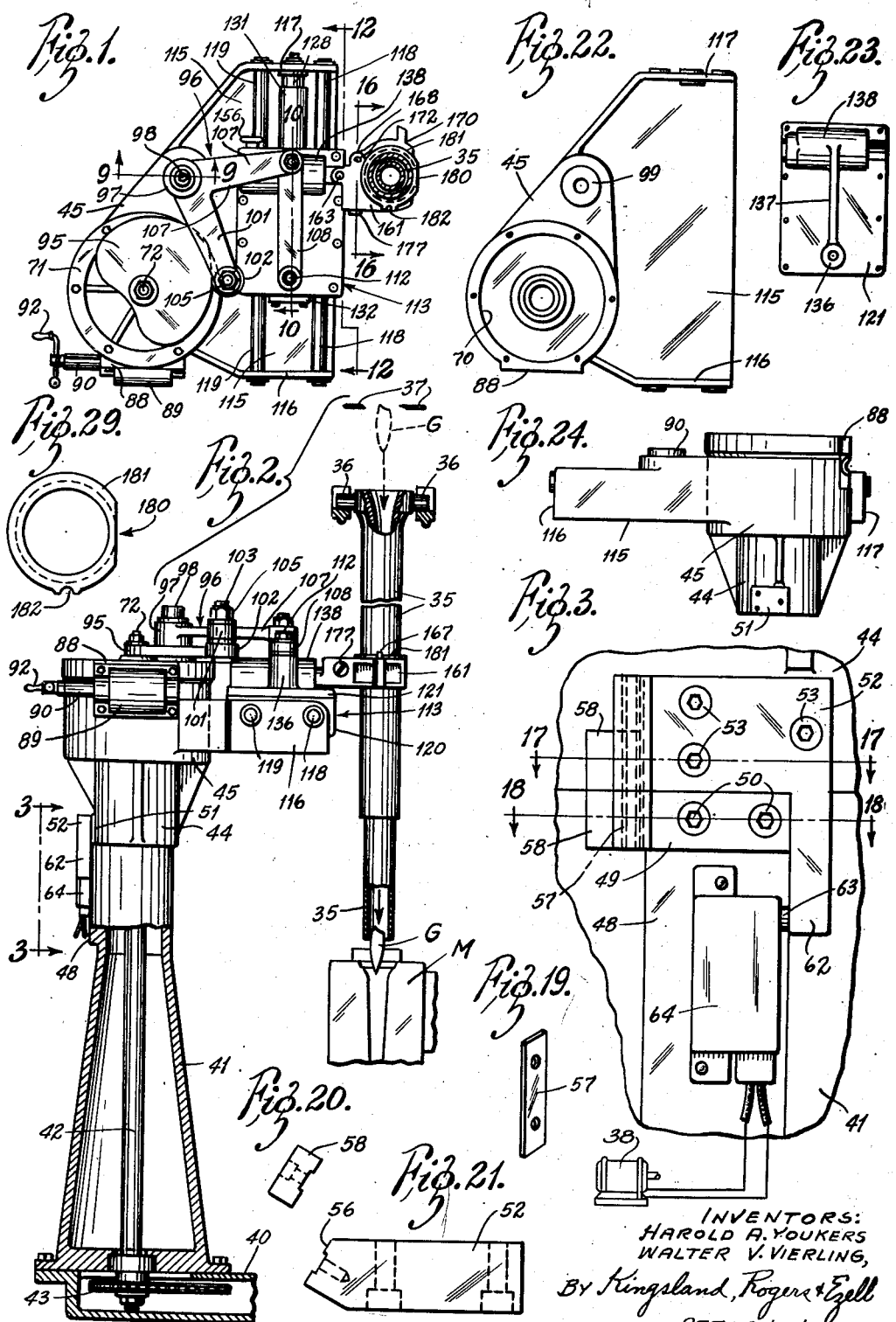

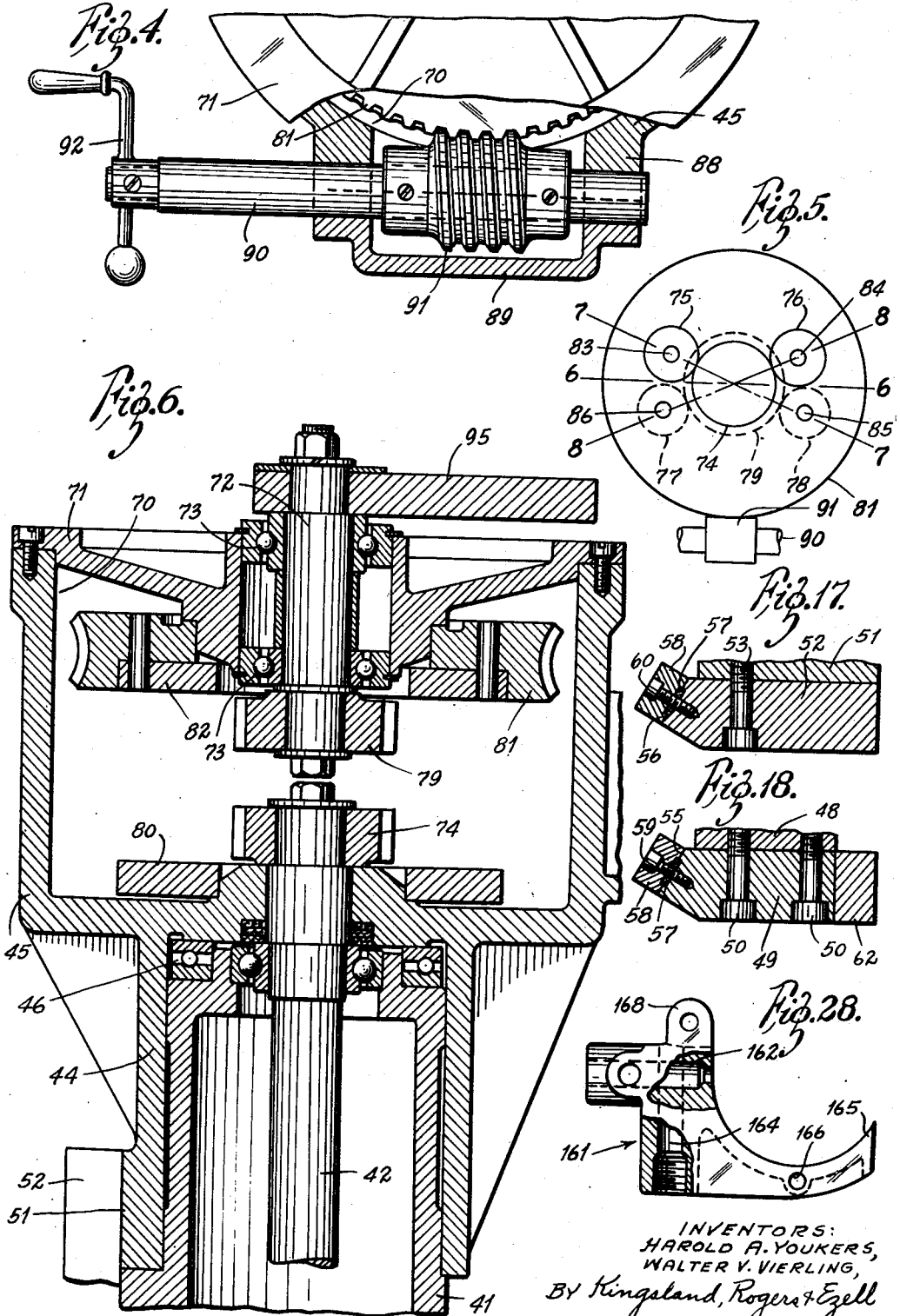

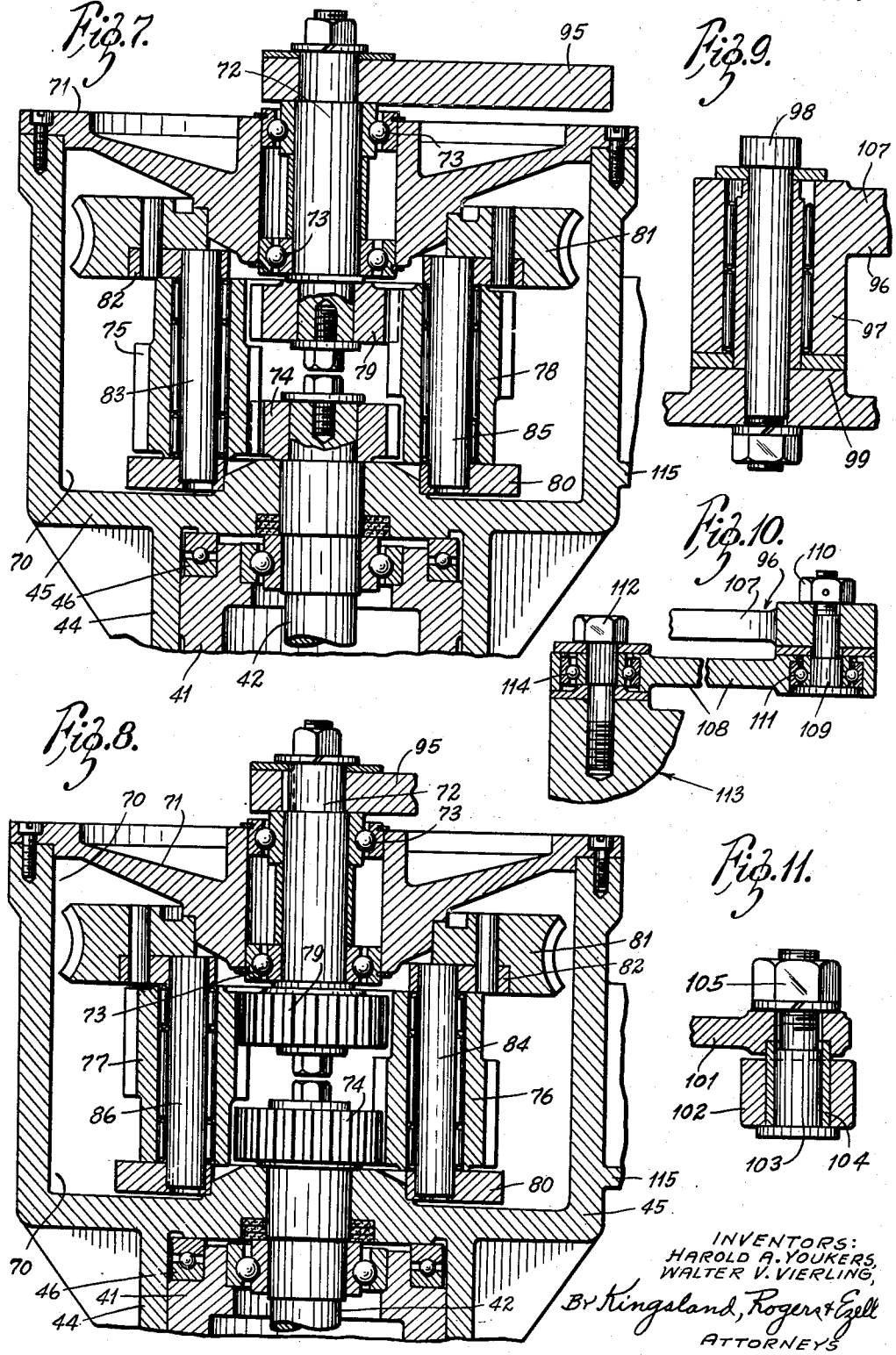

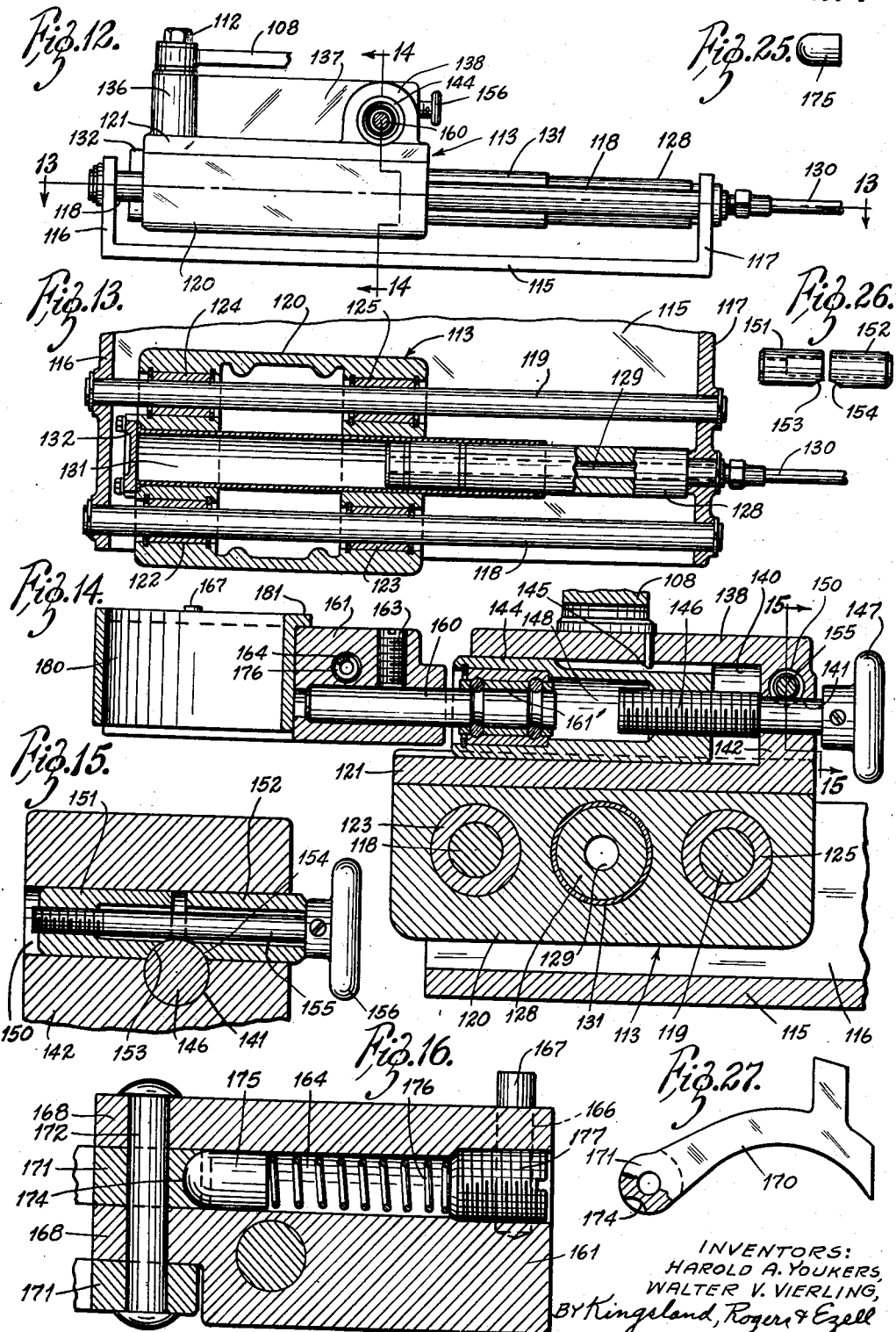

2,665,525

UNITED STATES PATENT OFFICE 2,665,525

GUIDE TUBE OPERATING MEANS FOR GLASS FEEDERS

Harold A. Youkers, Anderson, Ind., and Walter V. Vierling, Knox, Pa., assignors of one-half to Henry C. Daubenspeck, Massillon, Ohio, and one-half to Samuel E. Winder, West Medway, Mass.

Application August 5, 1950, Serial No. 177,856

24 Claims. (Cl. 49—14)

The present invention relates to an operating means for guide tubes that may be used with glass feeders to direct the glass charge properly from the feeder into the mold below the feeder. Such a glass feeder tube and related operating mechanisms are shown in copending application Serial No. 688,471, filed August 5, 1946, in the name of Samuel E. Winder, said application having since matured into Patent No. 2,598,955, dated June 3, 1952.

In general, this type of feeder tube is used with the gob type of glass feeders, by which a series of separated charges are delivered from the stationary feeder to a rotating or otherwise moving series of glass molds that are located some distance below the outlet of the feeder. In view of the fact that the glass charge or gob must descend vertically by gravity, and yet must properly enter a mold that is moving laterally or arcuately, and cleanly descend to the bottom of its mold cavity, the function of the feeder tube is to translate the vertical movement into a movement having a lateral component that will give a lateral movement to the descending gob that is substantially similar to the lateral movement of the successive glass molds as they enter the positions in which they are to be charged.

As set forth in the other application mentioned, the present feeder tube is mounted in trunnions at its upper end, which upper end is disposed immediately below the shears that are associated with the glass feeder. In addition, there is a mechanism that engages the tube below the trunnions so as to swing its lower end in an arc about the trunnions. This operating mechanism is synchronized with the rotating table of the glass molding machine so that the tube swings over the path of movement of the mold table; and furthermore, the synchronization is such that the tube swings with each successive mold for a limited angular movement of the mold, at which time the charge of glass is dropped. By this arrangement, the charge of glass is given a lateral component so that it will descend cleanly into the lower end of the blank mold despite the lateral component of movement of the mold. After the discharge of the glass into the mold, the lower end of the tube is brought rapidly back so that it may perform a similar function in connection with a successive mold that moves across the charging path.

It will be evident that, with the tube thus swinging in a path that more or less coincides with part of the path of the molds, there is always a chance that the tube may be struck by part of the moving molding machine if its various operating elements are, for some reason, abnormally positioned. The present invention has means to enable the tube or the actuating mechanisms to be moved by such abnormally projecting parts of the molding machine without breaking the parts of either or without breaking the molding machine elements. This has three aspects to it, in that there is a first means that immediately engages the tube to rock it back and forth which consists of a jaw-like device that can come open to release the tube under the influence of certain forces that could be applied to it by an irregularly operating molding machine. Secondly, the operating means for the tube includes a head that is mounted at the top of a column. Its mounting is such that it can be swiveled, but is normally held against such swiveling by a shear plate. If a heavy force acts against the projecting parts of the head of the machine or against the tube, the shear plate is broken, whereupon the head of the tube operating mechanism swivels around, freeing itself from the tube and permitting the tube to swing freely until the molding machine parts clear it. In conjunction with this shear plate mechanism is a safety switch, which in turn deenergizes the control switch magnet and allows the main drive motor brake to decelerate the machine and bring it to a safe stop. The foregoing safety arrangement is one that operates despite the fact that power is transmitted through the connection between the column of the tube operating means and the head thereon.

Another feature of the present invention that constitutes an improvement over the former application referred to lies in the mechanism for synchronizing and adjusting the tube swinging elements with the driving means for the mold table. This adjusting mechanism of the present application can be operated while the various parts are in movement. Thus, the adjustment can be made so as to time the tube swinging precisely with the movement of the molds, and particularly, in any desired relative position with the mold, as dictated by fabrication requirements.

In addition to the foregoing adjustment, the present invention has an improved means for preliminary adjustment of the swinging device, by means of which the tube engaging parts thereof can be adjusted radially outward or inward with respect to the column and locked in adjusted position. This permits a proper set-up of the column with respect to the table of the molding machine and with respect to the feeder to be made.

There are a number of other improvements in this guide tube operating means which will appear from the description to follow.

In the drawings:

Figure 1 is a plan view of the mechanism with the guide tube shown in section;

Figure 2 is a side elevation of the guide tube operating means showing the shears of the feeder in section, the guide tube partly in section, and the column partly in section;

Figure 3 is an enlarged elevational fragment taken from the side of the column at approximately the line 3—3 of Figure 2, showing a control switch and parts of the shear plate arrangement;

Figure 4 is a fragmentary, horizontal section of part of the adjusting means for the guide tube operating means;

Figure 5 is a diagrammatic view showing the relationship of the gearing for the guide tube head adjusting means;

Figure 6 is a diametrical section through the adjusting gearing and through the head of the guide tube operating means; taken on the line 6—6 of Figure 5;

Figure 7 is a similar section but taken on the line 7—7 of Figure 5;

Figure 8 is a similar section but taken on the line 8—8 of Figure 5;

Figure 9 is a vertical section through the pivot mounting of the cam driven rocker arm, taken on the line 9—9 about the middle of Figure 1;

Figure 10 is a vertical section through the connecting link between the bell crank and the slide, taken approximately on the line 10—10 of Figure 1 and partly foreshortened;

Figure 11 is a transverse section through the cam roller mounting of the bell crank arm;

Figure 12 is an elevational view of the slide and associated parts, taken approximately on the line 12—12 at the right side of Figure 1;

Figure 13 is a horizontal section through the slide and its air drive mechanism, taken on the line 13—13 of Figure 12;

Figure 14 is a vertical section through one of the adjusting means for the tube engaging arm mounted on the slide, taken approximately on the line 14—14 of Figure 12;

Figure 15 is a vertical section through the locking means for the adjustment of Figure 14, taken on the line 15—15 at the right of Figure 14;

Figure 16 is a sectional view showing a detent for holding the tube engaging jaws in predetermined position; and taken approximately on the line 16—16 of Figure 1;

Figure 17 is a horizontal section showing the shear plate parts, taken on the line 17—17 of Figure 3;

Figure 18 is a similar section taken on the line 18—18 of Figure 3;

Figure 19 is a perspective view of the shear plate;

Figure 20 is a plan view of a shear plate molding block;

Figure 21 is a plan view of one of the shear plate mounting members;

Figure 22 is a plan view of the main head member;

Figure 23 is a plan view of the slide cover;

Figure 24 is an elevation of the main head member, taken from the left side of the head member as it appears in Figure 22;

Figure 25 is a view of the detent pin or plug for holding the jaws shown in Figure 16;

Figure 26 is a view of the clamping sleeves for clamping the tube engaging arm;

Figure 27 is an elevational view partly broken away of one of the tube engaging arms or jaws;

Figure 28 is a similar view partly in section of the other of the two tube engaging jaws; and Figure 29 is a top plan view of a flanged bushing.

Reference particularly to Figures 1 and 2 shows that there is a glass feeding guide tube 35 that is mounted on trunnions 36 at its upper end, by means of which it may rock back and forth generally in a plane. The upper end of the tube is disposed slightly below two shear blades 37 that are conventionally used in connection with gob type glass feeders to sever a depending mass or gob of glass just below the forehearth of the glass melting furnace. This gob of glass, shown in full lines at G just as it enters the mold M, is also shown in dotted lines at the point of severance as it is ready to enter the guide tube 35. It will be understood that the mold M is normally traveling in an arc about a vertical axis that is to the right of Figure 2, so that it is disposed below the shears 37 and the other parts of the feeder for only a moment in its circular travel. The guide tube 35 is required to insure that the charge G of glass will descend cleanly to the bottom of the cavity of the mold. As the mold has a lateral component of movement, the gob G must be given a lateral component of movement lest it be compressed against the walls of the mold cavity as soon as it enters the mold. It is a function of the guide tube 35 and its swinging mechanism to impart the gob G a proper lateral component of movement so that it will descend cleanly to the bottom of the mold cavity.

To accomplish the foregoing object, the tube 35, which is of any suitable length, can be rocked on its trunnions 36 so that it may describe a path that is in a plane tangential to the circle of the mold cavities. With the trunnions at the top of the tube, there is little movement of the inlet of the tube, so that it is always in position to receive a charge of glass. As the charge descends through the tube, however, it is required to follow the swinging movements of the lower part of the tube. When the rocking is properly adjusted with the rotation of the molding machine, the bottom end of the guide tube 35 will move at least momentarily in substantial coincidence with the path of movement of the mold. Hence, at the instant the charge leaves the tube and descends into the mold, it is moving both downward and laterally, the lateral component substantially coinciding with the direction of movement of the mold, so that the charge will drop cleanly into the bottom of the mold. The foregoing is explained in the previous application mentioned.

Thus it will be seen that as the guide tube 35 is rocked, it can be adjusted while the machine is in motion and the point of synchronization with the rotation of the molding machine can be selected as may be dictated by the glass fabrication requirements of the job in hand. This adjustment of the rocking means constitutes the principal subject of the present invention.

Referring especially to Figure 2, there is a base 40 that may constitute a projection from the base of the molding machine itself, as shown in the other application. A supporting column 41 is mounted on this projection 40, and supports a vertical driving shaft 42. This driving shaft extends into the base 40 and has a chain drive connection 43 to a driving means (such as a motor 38 depicted schematically in Fig. 3) that preferably synchronizes the rotation of the shaft 42 with the drive of the glass machine that rotates the mold M.

The upper end of the column 41, as shown particularly in Figure 6, is machined circularly so as to receive a vertical sleeve 44, which sleeve bearing is preferably an integral part of a head casting 45. An appropriate frictionless bearing 46 may be provided to take the vertical load of the head, so that the head may rotate about the axis of the column 41.

As previously suggested, the head casting 45 is designed to be held in fixed angular position with respect to the column under all normal operating conditions; but it is also designed to be broken loose so that it can be rotated in the event some part of the molding machine strikes a projecting part of the tube swinging mechanism. This is provided by a shear plate arrangement. The shear plate arrangement includes a flat pad 48 on the column to which a shear block 49 is fastened by screws 50. Designed to be just above the flat pad 48, the rotatable head has a pad 51, shown particularly in Figures 24 and 17, to which a block 52 is fastened by screws 53.

Reference to Figures 3, 17 and 18 will show that the two blocks 49 and 52 have angularly projecting edges 55 and 56 that can be disposed one above the other in a common vertical plane. A shear plate 57 is clamped in vertical position across these two edges 55 and 56, and is bolted into place by two identical clamp blocks 58. The lower of the clamp blocks 58 is fastened across the end of the shear block 49 by a screw 59, and the upper of the two clamp blocks 58 is similarly fastened by a screw 60 to the upper shear block 52. The parts may be grooved, as illustrated, to enclose the shear plate 57. By this arrangement, the shear plate holds the head against rotation with respect to the column 41, but can be sheared by torsional force applied to the head, so that the head may rotate about the bearing 44, 46.

In addition to the shear arrangement, the foregoing parts are associated with a safety switch control. Figure 3 shows that the upper shear block 52 has a depending arm 62 that depends below the other shear block 49, and is in position to engage the operating button 63 of a control switch 64 that is mounted upon the pad 48 of the column 41. Thus, if a movement of the head 45 to the right in Figure 3 should occur, breaking the shear plate 57, the button 63 will be released and it can, by familiar switch action, open the switch 64 to deenergize the driving motor 38 of the molding machine. This will stop the parts and prevent further damage. If the mechanism is used in connection with a synchronizer such as shown in copending application Serial No. 734,114, filed March 12, 1947, in the name of Samuel E. Winder, now patent No. 2,540,154 bearing date of February 6, 1951, the feeder can be continued in operation but the forming machine stops. Otherwise, the practice would be to stop the entire machinery to prevent any further damage of any kind.

The head casting 45, as previously mentioned, constitutes the primary supporting means for the operating mechanisms for rocking the guide tube, and it translates the rotating movements of the shaft 42 into a reciprocating movement that, in turn, causes the tube 35 to move back and forth.

An adjustable synchronizing drive means is shown particularly in Figures 6, 7 and 8. The casting 45 has a recess 70 in it that constitutes a gear box, into the lower end of which the driving shaft 42 projects. A circular cover 71 is held by screws to close the top of the gear box 70. This cover 71 supports an output shaft 72 that is mounted in suitable bearing 73 for frictionless rotation. The two shafts are coaxial. Adjusting gearing is located in the gear box 70 and is designed to change the angular relationship between the shafts 42 and 72 at any given time.

The gearing includes a gear 74 that is secured to the upper end of the driving shaft 42 to rotate therewith. The gear 74 is the driving gear of a system that is diagrammatically illustrated in Figure 5, wherein the parts are slightly displaced and modified in size to clarify the illustration. In Figure 5, the gear 74 is the central solid circle. It is adapted to mesh with two gears 75 and 76, illustrated by solid lines, which, in turn, mesh with two gears 77 and 78 that are shown in dashed lines. The two gears 77 and 78, in turn, mesh with a gear 79 also shown in dashed lines. Thus, in any position of adjustment, the drive is from the gear 74 to the gears 75 and 76, and from them to the gears 77 and 78, respectively, which finally mesh with the gear 79. The driven shaft 72 rotates oppositely to the drive shaft 42.

The particular arrangement of the foregoing gears will now be described.

The gear 74 is shown in Figures 7 and 8 as fixed to the shaft 42, and the gear 79 is similarly mounted on the shaft 72. A ring 80 is rotatably supported on a center hub portion of the gear case 70 at the bottom thereof. There is a corresponding hub on the cover 71 for the gear case, and this hub rotatably supports a relatively large worm gear 81 which has a ring 82 pinned to it.

The rings 80 and 82 support four vertical shafts 83, 84, 85 and 86. The assembly of the rings 80 and 82, and the shafts, constitutes a planetary cage, the gear system being of the planetary type in which the cage is normally fixed.

The shaft 83 supports the gear 75. As Figure 7 shows, this gear has teeth on its lower two-thirds, which thereby cause it to be in mesh with the gear 74 but out of mesh with the gear 79. Figure 8 shows that the shaft 84 has a similar arrangement for the gear 76, which also is driven from the gear 74.

Figure 7 also shows that the gear 78 is mounted upon the shaft 85 with its upper two-thirds provided with teeth and its lower third clear, so that it meshes with the driven gear 79 but not with the driving gear 74. Figure 8 shows that the shaft 86 supports the gear 77, which, like the gear 78, is in mesh with the driven gear 79 but is clear of the gear 74.

The middle thirds of the two gears 75 and 77 are in mesh; as are the middle thirds of the gears 76 and 78. The drive is from the gear 74 to the two gears 75 and 76, from the two latter gears through their middle thirds to the gears 77 and 78, and from the latter two gears to the driven gear 79 and the output shaft 72.

The large worm gear 81 can be adjusted around its hub at the center of the cover 71, which is around the axis of the two shafts 42 and 72. To this end, the gear case 45 has an extension 88 shown in Figures 4 and 22, covered by a cap 89, which receives a worm shaft 90 having a worm 91 thereon engaged with the worm gear 81. A handle 92 is provided for rotation of the worm 91. When the worm is rotated, the worm gear 81 will be rotated which will displace the rings 80 and 82, and with them the four shafts 83, 84, 85 and 86. If it be assumed at this time that the shaft 42 is stationary, then such rotation will cause a displacement of the several shafts 83—86 around the axis of the main shaft 42. During such rotation, they will roll over the driving gear 74, and will drive the shaft 72 so as to change the angular relation thereof with respect to any given position of the shaft 42.

The shaft 72 has a cam 95 keyed to its upper end outside of the gear case cover 71. This cam is adapted to rock a bell crank arm 96. The bell crank arm has a hub 97 mounted with frictionless bearings upon a rocking pin 98, illustrated in Figure 9, for which a suitable pad 99 is provided on the main casting 45 (Figure 22).

The cam roller arm of the bell crank 96 is designated at 101. Figure 11 shows this arm as having a cam roller 102 supported below it and at its ends. A headed pin 103 passes through the roller 102 and a spacer bushing 104, the parts being held together by a suitable nut arrangement 105. The roller 102 is at an elevation to be engaged by the edge of the cam 95.

The other arm 107 of the bell crank 96 is connected to one end of a link 108. The connection is effected through a headed pin 109 that is held in place by a nut 110, there being a frictionless bearing 111 between the pin 109 and the link 108.

The outer end of the link 108 is mounted by a screw 112 to a slide, generally indicated at 113, there being a frictionless bearing 114 to provide for free rocking of the link 108 with respect to the slide 113. It will appear that the slide 113 is divided into a main slide and a cover plate, and that the connecting rocking pin 112 is fastened onto the cover plate.

Figure 22 shows that the casting 45 has a large flat table-like projection 115 to the right in that view of the drawings, which has two flanging walls 116 and 117. These two walls appear at the opposite ends of the views in Figurse 12 and 13.

Two guide rods 118 and 119 extend across between the walls 116 and 117. The rods 118 and 119 are firmly secured and stabilized. The slide 113 is mounted on the two rods 118 and 119 so as to reciprocate back and forth on them.

The slide 113 includes a bottom portion 120 and a cover 121. The bottom portion is essentially a hollowed-out casting, and is provided with four bearings 122, 123, 124 and 125 that ride on the two bars 118 and 119, as indicated in Figure 13. A preferred type of bearing is a linear ball bearing, since this reduces friction.

A fixed piston 128 is mounted at one end in the wall 117 so as to have a rigid mounting and to project across the main support 45 above the table 115 thereof. This piston has a passage 129 axially through it that may connect with a suitable air pressure pipe 130. The slide bottom portion 120 has a cylinder sleeve 131 mounted in it, as shown in Figure 13, this preferably being a relatively thin seamless tube. The end of the sleeve 131 is flanged over and a bolted cap 132 secures the sleeve in position and seals the end of it. The other end of the sleeve fits over the end of the fixed piston 128 and seals therewith. As will be apparent, the admission of air under pressure through the tube 130 and the passage 129 in the fixed piston 128 will put air pressure inside the cylindrical sleeve 131 and will yieldably urge the slide 113 to the leftward position illustrated in Figure 13. Reference to Figure 1 will show that this yieldable pneumatic force urges the bell crank 96 so as to maintain its roller 102 against the cam 95.

The slide cover 121 is bolted to the slide carriage 120 as is illustrated in Figure 1. The upper surface of the slide cover has a boss 136 projecting above it to receive the mounting for the link 108. This boss is connected by a web 137 that extends along the upper surface of the cover and merges in a transverse more or less semi-cylindrical boss 138.

The boss 138 has an enlarged circular opening 140 extending into it (Figures 12 and 14). A reduced opening 141 forms a continuation of one end of the enlarged opening 140, the opening 141 passing through an end wall 142 of the boss 138.

A circular mandrel 144 is shaped to fit within the opening 140. A pin and slot arrangement 145 holds the mandrel against rotation about its own axis and limits its movement to axial movement in and out of the opening 140. The mandrel may be adjusted in and out by an adjusting screw 146 which has a reduced, shouldered portion fitting through the opening 141 in the end wall 142, which portion permits rotation but prevents axial movement of the screw. A handle 147 on the end of the screw 146 provides for turning of the screw. The inner end of the screw 148 is threaded through an end wall of the mandrel 144, and opens into a recess 149 extending inwardly from the opposite end of the mandrel, so that rotation of the handle 147 moves the mandrel in and out, the mandrel being held against rotation by the pin 145.

In order to lock the mandrel in adjusted position, there is a sleeve type clamping lock of which the details are shown in Figure 15, but with other figures on the same sheet illustrative of other phases of this lock.

The end wall 142 of the boss 138 has a transverse hole 150 extending through it. This hole partly intersects the hole 141 and is at right angles to that hole so that the upper part of the reduced portion of the adjusting screw 146 extends into the transverse opening 150, as shown especially in Figure 15. Two complementary clamping sleeves 151 and 152 are shaped to fit closely within the opening 150. They are separated over the screw 146 and have arcuate complementary cut-outs 153 and 154 (Figure 26), which arcuate cut-outs are on the same radius as the shouldered portion of the screw 146. A clamping screw 155 has a knob 156 on its outer end, and it has a shank that passes through the sleeve 152 and is threaded into the sleeve 151. It can be seen from Figure 15 that, when the handle 156 is turned up, the two sleeves 151 and 152 will be clamped together between the threading, and the hub of the handle 156. By this means, the mandrel may be adjusted and locked in adjusted position.

The mandrel is the supporting connection between the slide 113 and the tube engaging jaw means. A short shaft 160 is retained within the hollow mandrel for rocking movement therein by a frictionless bearing 161′, the bearing here shown as being of the ball type. The shaft 160 receives at its outer end a fixed clamping jaw element 161 (see particularly Figures 1, 2, 14 and 28). Figure 28 shows that the jaw 161 has a bore 162 into which the end of the shaft 160 is fastened. A setscrew 163 is provided to secure the jaw member 161 firmly onto the shaft 160. There is also a cross bore 164 in the jaw member 161 to receive a detent for a purpose to appear, and the jaw member includes an arcuate arm 165. A bore 166 is formed in this arm 165, and receives a pin 167 for a purpose to appear. The jaw member 161 is provided with hinge ears 168.

A complementary jaw member 170, shown in Figure 1, and shown in detail in Figure 27, is hinged to the jaw member 161. It has hinge ears 171 that interfit with the ears 168 on the jaw member 161; and a hinge pin 172 passes down through the four hinge ears to hinge the jaw members together.

The jaw member 170 has a detent recess 174 in one of its hinge ears 171, as shown in Figures 16 and 27. When the jaw members are hinged together, and are in closed position shown in Figure 1, the recess 174 is disposed at the end of the cross bore 164 of the jaw member 161. A detent plug 175 is slidable within the bore 164, it being urged into detent position by a coil spring 176 that is held by a plug 177 threaded into the end of the bore 164. By this arrangement, the two jaws are held normally in a closed position wherein their inner edges form a continuous arc. A bushing that is substantially circular, as illustrated at 180 (see Figure 29), fits between the two jaws, and it has a flange 181 that is notched on one side at 182. This notch 182 fits against the pin 167 to stabilize the bushing 180 against rotation, but it will permit the jaws to open away from the bushing. The bushing 180 is sized to receive the guide tube 35, and to move with it. By the foregoing arrangement, the guide tube may be moved (upwardly in Figure 1) away from the fixed jaw 161, swinging the movable jaw 170, the bushing 180 staying with the guide tube. For normal operation, the detent arrangement prevents such separation of the guide tube from the jaws. Also, it will be seen that the shaft 160, being rockable in the mandrel 144, can follow the angular swinging movements of the guide tube 35 as the jaws 161 and 170 slide along the guide tube to permit the reciprocal movement of the slide 113 to produce the rocking movements of the tube 35.

Operation

In initially installing the machine, the column 41 is mounted in fixed relationship to the guide tube, which, in turn, has a fixed relationship with the molds M that rotate on the mold table. The shaft 42, by means of the driving connection 43, is connected to a power means that is either the same as or synchronized with the power means that drives the mold table, so that one cycle of the guide tube swinging means occupies the same time interval as that consumed by the mold table in moving each successive mold past a given point. The tube 35 is adjusted so that it swings properly to conduct the glass charges from the shears 37 of the feeder to the molds M as they move into position. The bushing 181 is slipped over the tube 35 and fitted into the two jaws.

With the tube depending over one of the molds M, the mandrel 144 is adjusted to move the tube engaging means, the jaws 161 and 170, in or out (with respect to the slide 113), so that the end of the tube has the proper position radially of the mold table. This adjustment is attained by first releasing the clamping knob 156 so that the two clamping sleeves 151 and 152 are freed from the screw 146. Then the handle 147 is turned to move the mandrel in or out to the proper position. After proper position is obtained, the handle 156 is again turned to tighten the two clamping sleeves 151 and 152 firmly against the screw 146 so that the mandrel is secured against axial movement.

Forward and backward movements of the slide 113 and the lower end of the guide tube 35 are obtained by the combination of the cam 95 and the compressible air force within the slide cylinder 131. The lower end of the guide tube 35 must swing across the top of the mold M as that mold moves across its charging position. Of course, the mold M is moving in an arcuate direction so that the tangential movement of the lower end of the guide tube 35 must intersect the arc of movement of the mold M substantially at the discharge point. As the molding machine is fairly large in diameter, there is, for practical purposes, a line of intersection of the tangential movement of the lower end of the tube 35 and the arcuate movement of the mold end.

Reference to Figure 1 will show that the cam member 95 is designed to have a rather abrupt rise from a starting position which is the middle of its concave edge portion. After such rise, the cam edge is such as to produce a somewhat slower advance of the tube 35. This means that the slide 113 will start at the position of Figures 12 and 13 (which would appear as a lowermost position in Figure 1). When the cam advances beyond the first abrupt portion, its subsequent edge parts will act upon the bell crank arm 96 to cause the slide to advance more slowly. The limit of the forward movement of the lower end of the guide tube is determined by the pressure of the air on the piston.

The slide 113 is always normally urged in its backward direction by the continuous maintenance of air under pressure within the cylinder 131. Thus the cam roller 102 is maintained against the edge of the cam 95. Since the air is compressible, the carriage or slide 113 may be moved forwardly under the positive action of the cam.

The cam action thus quickly advances the lower end of the tube 35, and then more slowly advances it to cause it to move along with the mold. The extreme forward movement does not change direction rapidly, a condition that makes synchronization easier, and that prevents accidental slight de-synchronization from causing bad accidents of production.

In order to adjust the point of synchronization of the rocking movements of the guide tube 35 with the molds M, the handle 92 may be turned while the machine is operating. If the handle 92 is turned, the worm 91 will move the worm gear 81 about its axis as it appears in Figures 7 and 8. This will cause the two rings 80 and 82 to move arcuately together with the gear 81. The planetary type gears 75, 76, 77 and 78 will be caused to rotate about their axes. The two planetary type gears 75 and 76 will rotate about their axes 83 and 84, while rolling over the edge of the driving gear 74. They will transmit such rotation to the two gears 77 and 78, which will thereby produce more or less rotation of the driven gear 79 than that imparted by the rotation of the shaft 42 and the driving gear 74. As a result, the cam 95 will be displaced angularly with respect to the shaft 42, and thereby the position of the slide 113 will be changed so that it can be synchronized with the rotation of the mold table. By this means, a very accurate point of synchronization can be obtained because of the ability to synchronize while the machine is operating and also because the gear trains lend to very close adjustment.

In Figure 1, it is assumed that the mold tables would rotate about an axis to the right of the figure, and so that the molds move upward with respect to Figure 1. This means that the mold M in Figure 2 is moving away from the observer. If some part on the mold table unexpectedly projects out so that it strikes the tube 35 in a manner that tends to displace the tube 35 other than the displacement normally given to it by the slide 113, the force thus applied to the tube will be great enough to overcome the detent spring 176 acting upon the detent plug 175. Then the recess 174 on the movable jaw member 170 is withdrawn from the spherical head of the plug 175 and the movable jaw 170 swings about its pivot pin 174, opening the jaws and permitting the tube 35 to be moved by the obstructive force, regardless of the cam and pneumatic action on the slide 113. In this action, the bushing 180 stays with the guide tube 35, it being permitted to withdraw from the fixed jaw member 161 because the notch 182 does not embrace the pin 167. By this arrangement, the guide tube operating means is saved from damage and the guide tube itself is likewise saved from injury.

Should an obstruction or some part of the molding machine strike the fixed jaw member 161, or any other part of the head, so that the parts cannot be freed by the opening of the jaws as aforesaid, the obstructive force will apply a torsion seeking to twist the entire head about the column. Such a force will shear the shear plate 57 so that the head may swivel about the axis of the column as provided by the sleeve 44 and the bearing 46. The force will merely move the head out of its path. As the head of the guide tube operating means moves about the axis of the column, it will tend to withdraw the jaw members from the guide tube 35. The jaw members being held closed only by the detent will open and release the guide tube so that the head can swing out of the way. The guide tube itself can then swing freely about its trunnions 36, so that it is not damaged by the obstructive force.

Also, this removal or twisting of the head of the guide tube operating means will withdraw the depending arm 62 on the shear plate block 52 from the switch button 63, so that the driving motor for the machine is deenergized before further damage can be caused.

It will be seen that the damaging forces are accommodated without injury to the various components of the machine. The arrangement is one that permits a drive through the movable parts, an operation that is accommodated by the planetary type adjusting gearing. After such action, it is ordinarily necessary to only restore the parts to proper positions, and replace the shear plate in order to start again in operation. Furthermore, this arrangement permits the use of a very rigid construction for the operation of the slide itself. The slide is rigidly guided by the two bars 118 and 119, and its friction is maintained at a minimum by the type of bearings used at 122—124, which, as noted, preferably may be of the linear ball bearing type. The use of rigid slide supports also permits the use of a relatively thin seamless tube for the cylinder 131, since this tube has a minimum of bearing requirements. With the seamless tube cylinder, replacements can be effected readily and as required.

The arcuate movement of the tube 35 requires a rocking movement of the bushing 180. With the present construction, this can be accommodated by the bearing 161', which desirably may be a type that provides a minimum of friction and yet a stable construction for a cantilever type of mounting.

It will be evident that a guide tube operating means has been provided that is extremely flexible in its operation and mounting, which is thoroughly strong and stable, and yet which can accommodate any of the accidents predictable in its use in connection with a rotating mold table. It imparts the proper lateral component of movement to the descending charge of glass so that it will move cleanly into the bottom of the mold cavity.

What is claimed is:

1. In a guide tube operating machine for imparting back and forth movements to a guide tube for delivering glass charges to molds, a support, a head, means mounting the head on the support for movement on the support, releasable means holding the head against movement on the support, means movably mounted on the head and having guide tube engaging means for imparting movement to the guide tube, driving means on the support, connecting, power-delivering means between the driving means and the movably mounted means on the support, said connecting means having driving parts that remain in driving connection despite movement of the head on the support as aforesaid.

2. In a guide tube operating machine for imparting back and forth movements to a guide tube for delivering charges to molds, a support, guide tube engaging means on the support, locking means releasably maintaining the guide tube engaging means in operating connection with the guide tube, and means for moving the guide tube engaging means to effect movements of the guide tube with movements of the engaging means, said locking means including resilient yieldable means having sufficient strength to maintain said operating connection during normal operations of the guide tube engaging means, but yieldable to free said connection when abnormal forces are applied to the guide tube.

3. In a guide tube operating machine for imparting back and forth movements to a guide tube for delivering charges to molds, a support, guide tube engaging means on the support, yieldable means releasably maintaining the guide tube engaging means in operating connection with the guide tube, and means for moving the guide tube engaging means to effect movements of the guide tube with movements of the engaging means, said yieldable means having sufficient strength to maintain said operating connection during normal operations of the guide tube engaging means, but yieldable to free said connection when abnormal forces are applied to the guide tube, said guide tube engaging means including an arm projecting into the path of, and embracing, the guide tube, a pivot connection for the arm, said yieldable means including a detent device for holding a section of said arm in operating position, but yieldable to enable the arm to swing out of the path of the tube.

4. In a guide tube operating machine for imparting back and forth movements to a guide tube for delivering charges to molds, a support, guide tube engaging means on the support, yieldable means releasably maintaining the guide tube engaging means in operating connection with the guide tube, and means for moving the guide tube engaging means to effect movements of the guide tube with movements of the engaging means, said yieldable means having sufficient strength to maintain said operating connection during normal operations of the guide tube engaging means, but yieldable to free said connection when abnormal forces are applied to the guide tube, means pivotally mounting the guide tube engaging means on the support, and releasable holding means for releasably maintaining the guide tube engaging means against pivoting relative to its support.

5. In a guide tube operating machine for imparting back and forth movements to a guide tube for delivering charges to molds, a support, guide tube engaging means on the support, yieldable means releasably maintaining the guide tube engaging means in operating connection with the guide tube, and means for moving the guide tube engaging means to effect movements of the guide tube with movements of the engaging means, said yieldable means having sufficient strength to maintain said operating connection during normal operations of the guide tube engaging means, but yieldable to free said connection when abnormal forces are applied to the guide tube, means pivotally mounting the guide tube engaging means on the support, and releasable holding means for releasably maintaining the guide tube engaging means against pivoting relative to its support, the holding releasable means comprising a shearable element connected between the pivotal mounting means and the support.

6. In a guide tube operating machine for imparting back and forth movements to a guide tube for delivering charges to molds, a base, a head, means mounting the head on the base for swinging movement of the head, shearable means releasably holding the head in operating position against swinging and adapted to shear upon the application of abnormal forces tending to swing the head, and guide tube moving means mounted on the head for movement thereon.

7. In a guide tube operating machine for imparting back and forth movements to a guide tube for delivering charges to molds, a base, a head, means mounting the head on the base for swinging movement of the head, yieldable means holding the head in operating position against swinging, guide tube moving means mounted on the head for movement thereon, an electrically actuated driving motor operatively connected to said guide tube moving means, and switch means for said motor adapted to be opened when the guide tube moving means swings from operating position.

8. In a guide tube operating machine for imparting back and forth movements to a guide tube for delivering charges to molds, a base, a head, guide tube moving means mounted for movement on the head, a driving shaft on the base, a driven shaft on the head and connected with the guide tube moving means to move the same in a predetermined cycle, and adjusting means operable during movemen of the driving shaft for adjusting the driven shaft about its own axis relatively to any particular angular position of rotation of the driven shaft with respect to its own axis.

9. In a guide tube operating machine for imparting back and forth movements to a guide tube for delivering charges to molds, a base, a head, guide tube moving means mounted for movement on the head, a driving shaft on the base, a driven shaft on the head and connected with the guide tube moving means to move the same in a predetermined cycle, and adjusting means operable during movement of the driving shaft for adjusting the driven shaft about its own axis relatively to any particular angular position of rotation of the driven shaft with respect to its own axis, said adjusting means including concentric gears connected respectively to the two shafts, and including at least one intermediate gear between the two gears, it having its separate shaft, and means for displacing the separate shaft about the common axis of the concentric gears.

10. In a guide tube operating machine for imparting back and forth movements to a guide tube for delivering charges to molds, a base, a head, guide tube moving means mounted for movement on the head, a driving shaft on the base, a driven shaft on the head and connected with the guide tube moving means to move the same in a predetermined cycle, and adjusting means operable during movement of the driving shaft for adjusting the driven shaft about its own axis relatively to any particular angular position of rotation of the driven shaft with respect to its own axis, said adjusting means including concentric gears connected respectively to the two shafts, and including at least one intermediate gear between the two gears, it having its separate shaft, and means for displacing the separate shaft about the common axis of the concentric gears, said displacing means having a ring concentric with the common axis, upon which the separate shaft is mounted, and means for imparting angular adjusting movements to the ring.

11. In a guide tube operating machine for imparting back and forth movements to a guide tube for delivering charges to molds, a base, a head, guide tube moving means mounted for movement on the head, a driving shaft on the base, a driven shaft on the head and connected with the guide tube moving means to move the same in a predetermined cycle, and adjusting means operable during movement of the driving shaft for adjusting the driven shaft about its own axis relatively to any particular angular position of rotation of the driven shaft with respect to its own axis, said adjusting means including concentric gears connected respectively to the two shafts, and including at least one intermediate gear between the two gears, it having its separate shaft, and means for displacing the separate shaft about the common axis of the concentric gears, the head having a gear case in which said gears are contained, a ring mounted near the driving shaft gear and concentric therewith, a ring mounted near the driven shaft gear and concentric therewith, means connecting the rings for conjoint angular movement about the common axis, the separate shaft being mounted on the two rings to support the intermediate gear between them.

12. In a guide tube operating machine for imparting back and forth movements to a guide tube for delivering charges to molds, a base, a head, guide tube moving means mounted for movement on the head, a driving shaft on the base, a driven shaft on the head and connected with the guide tube moving means to move the same in a predetermined cycle, and adjusting means operable during movement of the driving shaft for adjusting the driven shaft about its own axis relatively to any particular angular position of rotation of the driven shaft with respect to its own axis, the adjusting means including concentric gears connected to the driving and driven shafts respectively, a separate gear meshed with the driving gear, another separate gear meshed with the first separate gear and with the driven gear, means mounting the two separate gears for adjustment together around the common axis of the concentric gears.

13. In a guide tube operating machine for imparting back and forth movements to a guide tube for delivering charges to molds, a base, a head, guide tube moving means mounted for movement on the head, a driving shaft on the base, a driven shaft on the head and connected with the guide tube moving means to move the same in a predetermined cycle, and adjusting means operable during movement of the driving shaft for adjusting the driven shaft about its own axis relatively to any particular angular position of rotation of the driven shaft with respect to its own axis, said adjusting means including concentric gears connected respectively to the two shafts, and including at least one intermediate gear between the two gears, it having its separate shaft, and means for displacing the separate shaft about the common axis of the concentric gears, the head having a gear case in which said gears are contained, a ring mounted near the driving shaft gear and concentric therewith, a ring mounted near the driven shaft gear and concentric therewith, means connecting the rings for conjoint angular movement about the common axis, the separate shaft being mounted on the two rings to support the intermediate gear between them, and means extending through to the outside of the gear case to move the rings.

14. In a guide tube operating machine for imparting back and forth movements to a guide tube for delivering charges to molds, a base, a head, guide tube moving means mounted for movement on the head, a driving shaft on the base, a driven shaft on the head and connected with the guide tube moving means to move the same in a predetermined cycle, and adjusting means operable during movement of the driving shaft for adjusting the driven shaft about its own axis relatively to any particular angular position of rotation of the driven shaft with respect to its own axis, said adjusting means including concentric gears connnected respectively to the two shafts, and including at least one intermediate gear between the two gears, it having its separate shaft, and means for displacing the separate shaft about the common axis of the concentric gears, means mounting the head for angular movement on the base about the said common axis, and yieldable means holding the head against such movement.

15. In a guide tube moving means for displacing a guide tube for directing glass charges into a moving mold; movable means engageable with a guide tube for displacing it, and yieldable supporting means for holding the movable means in operating position, said yieldable supporting means including a shearable element adapted to shear under abnormal forces tending to displace the yieldable supporting means.

16. In a guide tube operating machine for imparting back and forth movements to a guide tube for delivering charges to molds, a base, a head, guide tube moving means mounted for movement on the head, a driving shaft on the base, a driven shaft on the head and connected with the guide tube moving means to move the same in a predetermined cycle, and adjusting means operable during movement of the driving shaft for adjusting the driven shaft about its own axis relatively to any particular angular position of rotation of the driven shaft with respect to its own axis, said adjusting means including concentric gears connected respectively to the two shafts, and including at least one intermediate gear between the two gears, it having its separate shaft, and means for displacing the separate shaft about the common axis of the concentric gears, there being a cam operated by the driven shaft, and the guide tube moving means including a device movable back and forth in a predetermined path; a cam follower connected between the device and the cam, and yieldable means to urge the follower against the cam.

17. In a guide tube moving means; a base, a device mounted on the base for reciprocatory motion in a path of predetermined correspondence with an angular path of a mold, guide tube holding means mounted for free rocking movement on the device and projecting therefrom, and means for adjusting the guide tube holding means to project different distances with respect to the device.

18. In a guide tube moving means; a base, a device mounted on the base for reciprocatory motion in a path of predetermined correspondence with an angular path of a mold, guide tube holding means mounted on the device and projecting therefrom, and means for adjusting the guide tube holding means to project different distances with respect to the device, said guide tube holding means including two jaw-like elements pivoted together to close alongside the guide tube, at least one of the elements being swingable to an open position to free the guide tube, and means yieldably holding the elements closed.

19. In a guide tube moving means; a base, a device mounted on the base for reciprocatory motion in a path of predetermined correspondence with an angular path of a mold, guide tube holding means reciprocably mounted on the device and projecting therefrom, and means for adjusting the guide tube holding means to project different distances with respect to the device, the adjusting means comprising a screw connection between the device and the guide tube holding means for reciprocating the latter on the former.

20. In a guide tube moving means; a base, a device mounted on the base for reciprocatory motion in a path of predetermined correspondence with an angular path of a mold; guide tube holding means including a mandrel reciprocably mounted in the device, and means for adjusting the mandrel with respect to the device, the adjusting means comprising a screw connection between the device and the mandrel for reciprocating the mandrel in the device, the mandrel having an opening therein, the guide tube holding means further including a shaft extending into said opening, bearing means in the opening providing for rockable support of the shaft in the mandrel, and guide tube engaging means on the shaft.

21. In a guide tube moving means; a base, a device mounted on the base for reciprocatory motion in a path of predetermined correspondence with an angular path of a mold, guide tube holding means mounted on the device and projecting therefrom, and means for adjusting the guide tube holding means to project different distances with respect to the device, the guide tube holding means including two jaw-like elements pivoted together to close alongside the guide tube, at least one of the elements being swingable to an open position to free the guide tube, means yieldably holding the elements closed, a guide tube embracing bushing between said jaw-like elements, and means holding the bushing against rotation on the elements, said latter means being adapted to free the bushing from the elements upon opening of the elements.

22. In a guide tube operating machine for imparting back and forth movements to a guide tube for delivering charges to molds, a base, a head, guide tube moving means including a slide mounted for reciprocatory motion on the head, a driving shaft on the base, a driven shaft on the head, and means connecting the driven shaft with said slide for controlled reciprocation of the latter in accordance with a predetermined cycle of movement.

23. In a guide tube operating machine for imparting back and forth movements to a guide tube for delivering charges to molds, a base, a head, guide tube moving means including a slide mounted for reciprocatory motion on the head, a driving shaft on the base, a driven shaft on the head, means connecting the driven shaft with said slide for controlled reciprocation of the latter in accordance with a predetermined cycle of movement, and fluid pressure means mounted on the head and connected with the slide for biasing the slide in one direction of its reciprocatory motion.

24. In a guide tube operating machine for imparting back and forth movements to a guide tube for delivering charges to molds, a base, a head, guide tube moving means including a slide mounted for reciprocatory motion on the head, a driving shaft on the base, a driven shaft on the head, means including a cam connecting the driven shaft with said slide, and fluid pressure means mounted on the head and connected with the slide, said fluid pressure means being adapted to move said slide in one direction of reciprocatory motion and said cam means being adapted both to move said slide in the other direction of reciprocatory motion and to control the velocity of movement in the one direction of reciprocatory motion.

HAROLD A. YOUKERS.
WALTER V. VIERLING.

References Cited in the file of this patent
UNITED STATES PATENTS

| Number | Name | Date |
|---|---|---|
| 392,133 | Peck | Oct. 30, 1888 |
| 595,103 | Hutchins et al. | Dec. 7, 1897 |
| 871,110 | Comings | Nov. 19, 1907 |
| 1,243,364 | Walker | Oct. 16, 1917 |
| 1,531,559 | Lynch | Mar. 31, 1925 |
| 1,531,560 | Lynch | Mar. 31, 1925 |
| 1,619,432 | Mulholland | Mar. 1, 1927 |
| 1,685,098 | Sklovsky | Sept. 25, 1928 |
| 1,755,397 | Hunter | Apr. 22, 1930 |
| 2,038,519 | Barnard | Apr. 28, 1936 |
| 2,209,018 | Peiler | July 23, 1940 |